United States Patent

[11] 3,588,276

| | | |
|---|---|---|
| [72] | Inventor | Albert Jubb<br>Kenilworth, England |
| [21] | Appl. No. | 856,425 |
| [22] | Filed | Sept. 9, 1969 |
| [45] | Patented | June 28, 1971 |
| [73] | Assignee | Rolls Royce Limited<br>Derby, England |
| [32] | Priority | Sept. 17, 1968 |
| [33] | | Great Britain |
| [31] | | 44131/68 |

[54] BLADED ROTOR ASSEMBLIES
10 Claims, 5 Drawing Figs.

[52] U.S. Cl.................................................... 416/95,
416/213, 416/217
[51] Int. Cl...................................................... F01d 5/08
[50] Field of Search........................................ 416/95,
213, 217

[56] References Cited
UNITED STATES PATENTS
874,398  12/1907  DeFerranti................... 416/95(ux)
FOREIGN PATENTS
139,298  11/1934  Austria........................... 416/213
885,851  8/1953  Germany....................... 416/213

*Primary Examiner*—Everette A. Powell, Jr.
*Attorney*—Cushman, Darby and Cushman ABSTRACT: The invention resides in a gas turbine engine bladed rotor assembly in which the blades have roots comprising at least four identical prongs which are arranged in a rectangular pattern and which are welded to a similar set of shorter prongs extending radially outwardly from the rotor, thus providing a flexible blade mounting and reducing heat transfer to the rotor.

PATENTED JUN 28 1971　　　　　　　　　　　　　3,588,276

Inventor
ALBERT JUBB

By Cushman Darby & Cushman
Attorneys

BLADED ROTOR ASSEMBLIES

This invention relates to bladed rotor assemblies to use in fluid flow machines, and is particularly but not exclusively concerned with compressor or turbine rotors for use in gas turbine engines.

According to the present invention a bladed rotor assembly comprises a rotor and at least one circumferential row of equiangularly spaced-apart blades, each blade having a root comprising at least four substantially identical spaced-apart radially inwardly extending pronglike members which are secured at their radially inner ends to the radially outer ends of an equal number of correspondingly arranged radially outwardly extending pronglike members provided on the circumference of the rotor, and which are arranged at the points of intersection of two sets of substantially uniformly spaced parallel lines which lie in a plane perpendicular to the pronglike members.

The pronglike members on the blades are preferably longer than the pronglike members on the rotor, thus ensuring that the joints therebetween are nearer to the rotor than to the blade.

In a preferred embodiment of the invention, the width of the space between adjacent pronglike members is approximately equal to half the width of one of the pronglike members.

Preferably the surface of the blade root between adjacent pronglike members and the surface of the rotor between adjacent pronglike members is smoothly concavely curved so as to reduce stress concentrations at the points from which the pronglike members extend.

The numbers and/or the dimensions of the pronglike members are preferably chosen to ensure that the natural frequency of each mounted blade lies outside the normal operating range of rotational speeds of the rotor assembly.

The ends of the pronglike members on the blade may be secured to the ends of the corresponding pronglike members on the rotor by diffusion bonding.

Alternatively, and preferably, the ends of the pronglike members on the blade may be secured to the ends of the corresponding pronglike members on the rotor by welding, for example electron beam welding or electrical resistance welding.

Where the material of the blades does not form a good weld with the material of the rotor, a further material compatible with both of the first-mentioned materials may be interposed between each pair of said ends to be welded together.

The ends of the pronglike members may be shaped to produce butt joints or scarf joints.

There may be provided means for directing a cooling fluid into the spaces between the pronglike members.

The rotor may be a drum-type rotor or a disc-type rotor.

The invention also comprises a gas turbine engine provided with a bladed rotor assembly in accordance with any of the above statements of invention.

The invention will now be described, merely by way of example, with reference to the accompanying drawings, of which:

Figure 1:
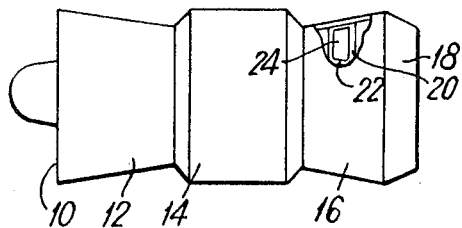
FIG. 1 is a diagrammatic partly broken-away view of a gas turbine engine provided with a bladed turbine rotor assembly in accordance with the present invention.
Figure 4:
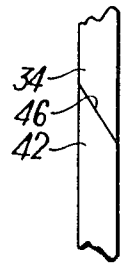
Figure 5:
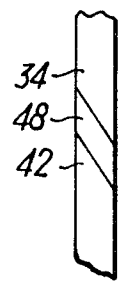

FIGS. 4 and 5 shown alternative types of welded joint between a blade and the rotor of the rotor assembly of FIG. 1.

The gas turbine engine shown in FIG. 1 comprises, in flow series, an air inlet 10, a compressor 12, combustion equipment 14, a turbine 16 which is drivingly connected to the compressor 12 and an exhaust section 18. The exhaust from the engine may be used for propulsive purposes or to drive a free power turbine (not shown).

Figure 2:
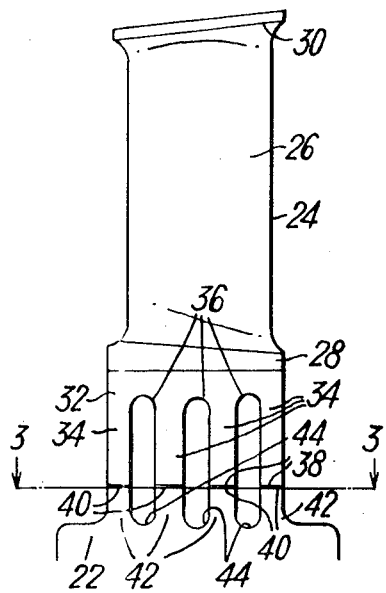
FIG. 2 is an enlarged diagrammatic view of part of the rotor assembly of FIG. 1.

The turbine 16 comprises a number of bladed rotor assemblies 20, one of which is shown in more detail in FIG. 2 and comprises a rotor disc 22 provide at its periphery with a circumferential row of equiangularly spaced-apart turbine blades identical to that shown at 24. The blade 24 comprises an aerofoil working portion 26 extending between radially inner and radially outer shroud members 28, 30 respectively, and a root 32.

Figure 3:
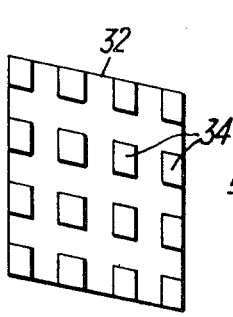
FIG. 3 is a diagrammatic sectional view on the line 3–3 of FIG. 2.

The root 32 comprises a plurality of spaced-apart radially inwardly extending similar prongs 34 arranged in a regular pattern at the points of intersection of two sets of uniformly spaced-apart parallel lines which lie in a plane perpendicular to the prongs 34 (see FIG. 3). The width of the spaces between adjacent prongs 34 is approximately equal to half the width of the prongs 34, while the surface of the root 32 between adjacent prongs 34 is smoothly concavely curved as shown at 36 so as to reduce stress concentrations.

The radially inner ends 38 of the prongs 34 are butt-welded for example by electron beam welding or electrical resistance welding, to the radially outer ends 40 of a correspondingly arranged set of radially outwardly projecting prongs 42 provided on the periphery of the rotor disc 22. The length of the prongs 34 and the length of the prongs 42 are chosen so that the welded joints therebetween are closer to the rotor 22 than to the blade roots 32: typically the joints are arranged to be three prong-widths from the rotor 40. The surface of the rotor 40 between adjacent prongs 42 is smoothly concavely curved as shown 44 so as to reduce stress concentrations.

If it is desired to produce stronger joints between the prongs 34, 42 their ends may be shaped to produce scarf joints 46 as shown in FIG. 4. Similarly, where the materials of the prongs 34, 42 are dissimilar and do not form a good weld, a further material 48 compatible with both the first-mentioned materials may be interposed (see FIG. 5) between the ends, which may be shaped as hereinbefore described to produce butt or scarf joints. In extreme cases, more than one further material may be interposed between the ends to be welded.

It will be appreciated that the ends of the prongs 34, 42 may alternatively be secured together by diffusion bonding, if the material or materials of which they are made lend themselves to this process.

In operation, a cooling fluid such as air bled from the compressor 12 of the engine, is directed into the spaces between the prongs 34, 42, thereby cooling the prongs 34, 42 and reducing the conduction of heat to the rotor 40. The positioning of the joints between the prongs 34, 42 nearer to the rotor 40 further reduces the temperature to which they are subjected.

Bladed rotor assemblies in accordance with the present invention have several further advantages. Stress concentrations in the roots 32 of the blades 24 and the periphery of the rotor 40 are less than those met, for example, in rotor assemblies employing firtree-root blade mounting. Also, the mounting of the blades 24 is somewhat flexible by virtue of the prongs 34, 42, and by suitable choice of the numbers and/or dimensions (particularly cross-sectional area) of the prongs 34, 42 the natural frequency of the mounted blades 24 can be arranged to lie outside the normal operating range of rotational speeds of the rotor assembly, thereby increasing the fatigue life of the rotor assembly. Further, failure of one or more of the prongs 34, 41 can be relatively simply detected by detecting the change in this natural frequency produced by the failure.

The invention is particularly applicable to the compressor and turbine rotor assemblies of a closed-cycle helium gas turbine engine employing a nuclear reactor to heat the helium.

I claim:

1. A bladed rotor assembly comprising a rotor and at least one circumferential row of equiangularly spaced-apart blades, each blade having a root comprising at least four substantially identical spaced-apart radially inwardly extending pronglike members which are secured at their radially inner ends to the radially outer ends of an equal number of correspondingly arranged radially outwardly extending pronglike members provided on the circumference of the rotor, and which are arranged at the points of intersection of two sets of substantially uniformly spaced parallel lines which lie in a plane perpendicular to the pronglike members.

2. A bladed rotor assembly as claimed in claim 1 wherein the pronglike members on the blades are longer than the pronglike members on the rotor.

3. A bladed rotor assembly as claimed in claim 1 wherein the width of the space between adjacent pronglike members is approximately equal to half the width of one of the pronglike members.

4. A bladed rotor assembly as claimed in claim 1, wherein the surface of the blade root between adjacent pronglike members and the surface of the rotor between adjacent pronglike members is smoothly concavely curved so as to reduce stress concentrations at the points from which the pronglike members extend.

5. A bladed rotor assembly as claimed in claim 1, wherein the numbers and dimensions of the pronglike members are chosen to ensure that the natural frequency of each mounted blade lies outside the normal operating range of rotational speeds of the rotor assembly.

6. A bladed rotor assembly as claimed in claim 1, wherein the ends of the pronglike members on the blade are secured to the ends of the corresponding pronglike members on the rotor by diffusion bonding.

7. A bladed rotor assembly as claimed in claim 1, wherein the ends of the pronglike members on the blade are secured to the ends of the corresponding pronglike members on the rotor by welding, for example electron beam welding or electrical resistance welding.

8. A bladed rotor assembly as claimed in claim 7, wherein an intermediate material compatible with both the material of the blades and the material of the rotor is interposed between each pair of said ends to be welded together.

9. A bladed rotor assembly as claimed in claim 7, wherein the ends of the pronglike members are shaped to produce butt joints or scarf joints.

10. A bladed rotor assembly as claimed in claim 1, wherein there is provided means for directing a cooling fluid into the spaces between the pronglike members.